United States Patent
Polan

(10) Patent No.: US 7,506,264 B2
(45) Date of Patent: Mar. 17, 2009

(54) METHOD AND APPARATUS FOR PRESENTING NAVIGABLE DATA CENTER INFORMATION IN VIRTUAL REALITY USING LEADING EDGE RENDERING ENGINES

(75) Inventor: Michael George Polan, Markham (CA)

(73) Assignee: International Business Machines Corporation, Armonk, NY (US)

( * ) Notice: Subject to any disclaimer, the term of this patent is extended or adjusted under 35 U.S.C. 154(b) by 436 days.

(21) Appl. No.: 11/117,148

(22) Filed: Apr. 28, 2005

(65) Prior Publication Data

US 2006/0248159 A1    Nov. 2, 2006

(51) Int. Cl.
*G06F 3/048* (2006.01)

(52) U.S. Cl. .................. 715/757; 709/208; 715/771

(58) Field of Classification Search .......... 715/757, 715/733, 734, 736, 740, 852, 853
See application file for complete search history.

(56) References Cited

U.S. PATENT DOCUMENTS

| | | | |
|---|---|---|---|
| 5,812,750 A * | 9/1998 | Dev et al. ............... 714/4 |
| 5,958,012 A * | 9/1999 | Battat et al. ............. 709/224 |
| 5,999,208 A | 12/1999 | McNerney et al. ........ 348/15 |
| 6,144,381 A | 11/2000 | Lection et al. ........... 345/355 |
| 6,437,777 B1 * | 8/2002 | Kamachi et al. .......... 345/419 |
| 6,767,287 B1 * | 7/2004 | Mcquaid et al. .......... 463/42 |
| 2002/0013837 A1 * | 1/2002 | Battat et al. ............. 709/223 |
| 2002/0065635 A1 * | 5/2002 | Lei et al. ................. 703/1 |
| 2002/0186244 A1 | 12/2002 | Matsuda et al. ........... 345/757 |
| 2003/0005439 A1 | 1/2003 | Rovira .................... 725/37 |
| 2003/0046689 A1 | 3/2003 | Gaos ...................... 725/34 |
| 2003/0063133 A1 | 4/2003 | Foote et al. .............. 345/850 |
| 2004/0021689 A1 | 2/2004 | Parker et al. ............. 345/771 |
| 2004/0027394 A1 | 2/2004 | Schonberg ............... 345/850 |
| 2004/0036675 A1 * | 2/2004 | Kajitsuka ................. 345/156 |
| 2004/0104935 A1 | 6/2004 | Williamson et al. ....... 345/757 |
| 2004/0104941 A1 | 6/2004 | Natoli .................... 345/772 |

* cited by examiner

*Primary Examiner*—Stephen S Hong
*Assistant Examiner*—Phenuel S Salomon
(74) *Attorney, Agent, or Firm*—Yee & Associates, P.C.; Jill Poimboeuf

(57) ABSTRACT

A method, an apparatus, and computer instructions are provided for presenting navigable data center information in virtual reality using leading edge rendering engines. Virtual rooms may be constructed using the mechanism of the present invention to include data center devices for a specific purpose. The virtual rooms are presented in a virtual space to the administrators. In one embodiment, responsive to a change made by administrators in the virtual space, the mechanism of the present sends change messages to existing data center management system, which in turn makes the appropriate changes to the devices or its data center information.

8 Claims, 7 Drawing Sheets

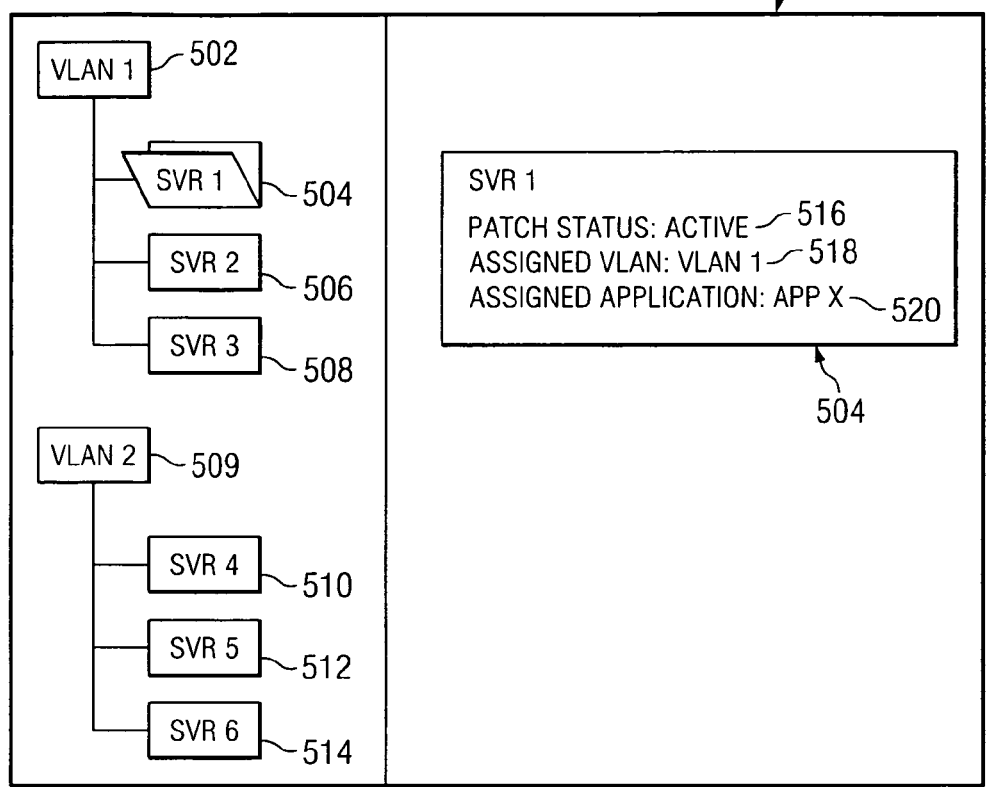
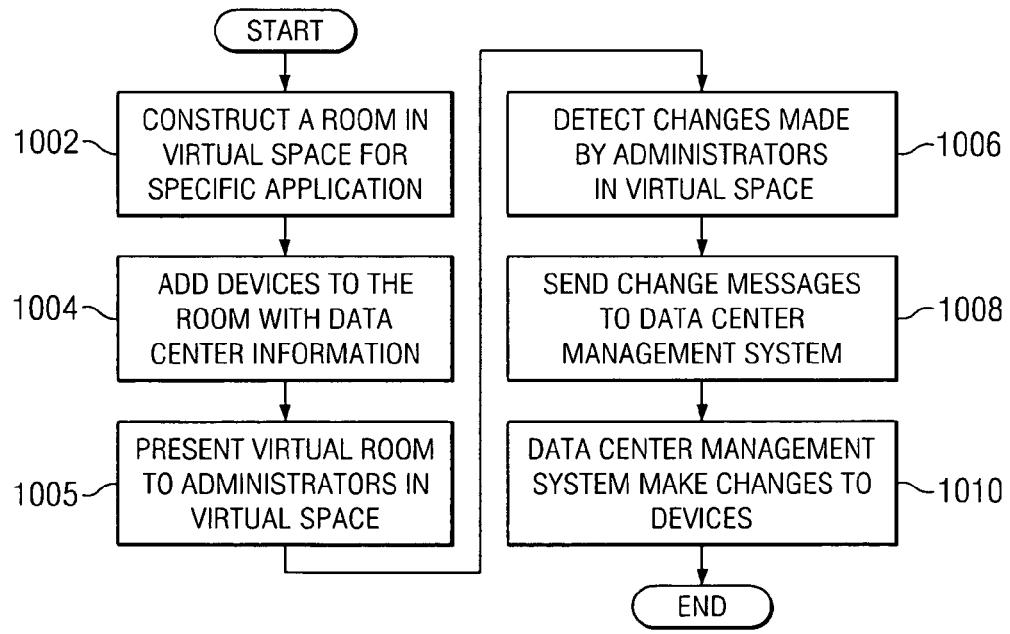

METHOD AND APPARATUS FOR PRESENTING NAVIGABLE DATA CENTER INFORMATION IN VIRTUAL REALITY USING LEADING EDGE RENDERING ENGINES

BACKGROUND OF THE INVENTION

1. Technical Field

The present invention relates to an improved data processing system. In particular, the present invention relates to presenting navigable data center information to users. Still more particularly, the present invention relates to presenting navigable data center information to users in virtual reality.

2. Description of Related Art

In a data center that comprises a large number of heterogeneous devices, information, such as inventories, assignments, statuses, and loads of the devices must be tracked and reported. Currently, data center management systems track and report this information statically using textual representation. While some systems present this information visually to show statuses and allocations of devices, it is difficult to navigate through all the devices since the volume of information to be rendered is large.

In addition, most data center management systems present the information in two-dimensions, which makes it cumbersome and time consuming for the users to interact with the data center inventory. Therefore, it would be advantageous to have an improved method to present data center information, such that the limitations of two-dimension displays may be eliminated and interactions with data center inventory is easier.

SUMMARY OF THE INVENTION

The present invention provides a method, an apparatus, and computer instructions in a data processing system for presenting data center information in virtual reality using leading edge rendering engines. The mechanism of the present invention constructs a virtual reality space using a virtual reality rendering engine, populates the virtual reality space with data center information, renders the virtual reality space in a user interface to at least one operator, and performs data center operations based on the commands responsive to receiving commands from the at least one operator.

BRIEF DESCRIPTION OF THE DRAWINGS

The novel features believed characteristic of embodiments of the invention are set forth in the appended claims. Embodiments of the invention itself, however, as well as a preferred mode of use, further objectives and advantages thereof, will best be understood by reference to the following detailed description of an illustrative embodiment when read in conjunction with the accompanying drawings, wherein:

FIG. 5 is a diagram illustrating a known two-dimensional representation of data center information;

FIG. 10 is a flowchart of an exemplary process for presenting data center information in virtual reality using leading edge rendering engines in accordance with an illustrative embodiment of the present invention.

DETAILED DESCRIPTION OF THE PREFERRED EMBODIMENT

Figure 1:
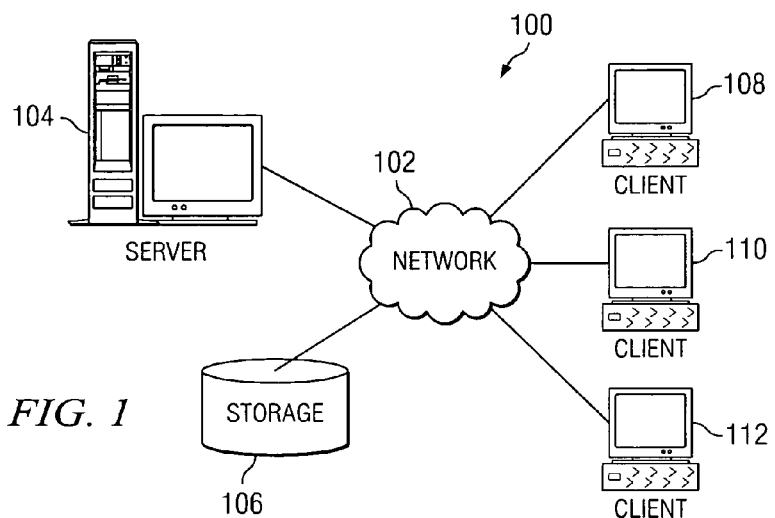
FIG. 1 depicts a pictorial representation of a network of data processing systems in which the present invention may be implemented.

With reference now to the figures, FIG. 1 depicts a pictorial representation of a network of data processing systems in which an illustrative embodiment of the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
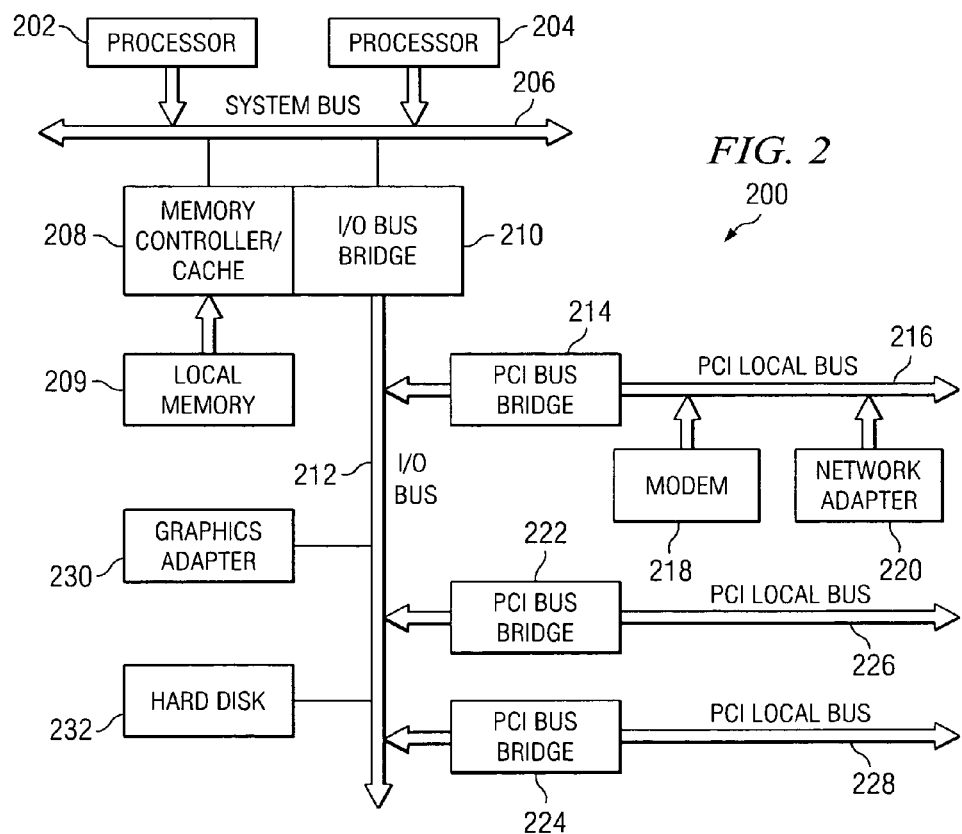
FIG. 2 is a block diagram of a data processing system that may be implemented as a server, in accordance with an illustrative embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or the LINUX operating system.

Figure 3:
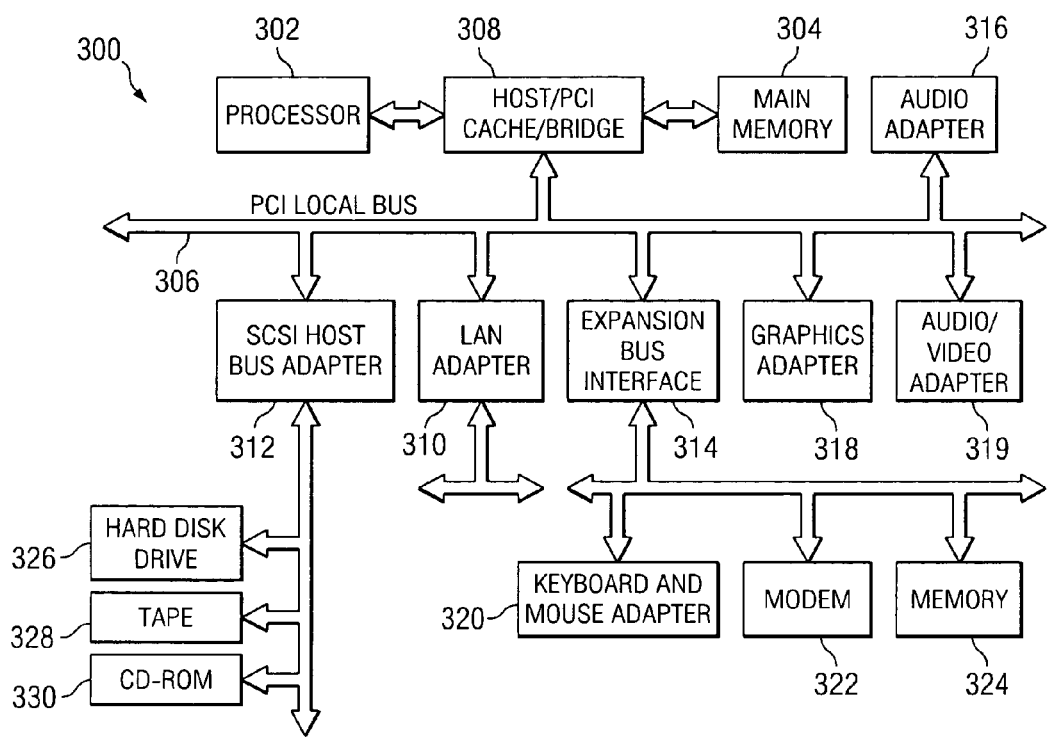
FIG. 3 is a block diagram of a data processing system in which an illustrative embodiment of the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows® XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
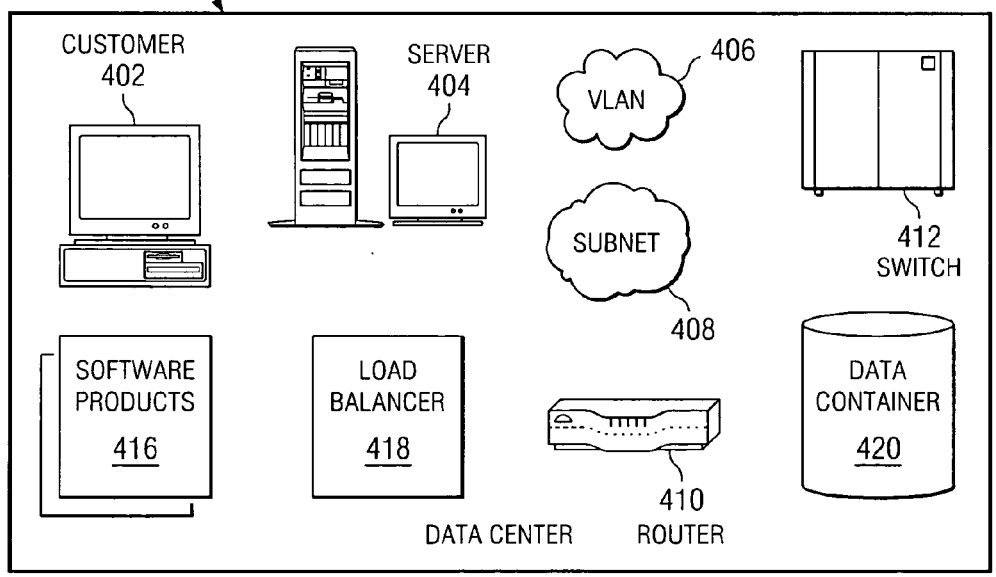
FIG. 4 is a diagram illustrating an exemplary data center, in accordance with an illustrative embodiment of the present invention.

Turning now to FIG. 4, a diagram illustrating an exemplary data center is depicted, in accordance with a preferred embodiment of the present invention. As shown in FIG. 4, in this illustrative example, data center 400 includes resources, such as, customer 402, server 404, Virtual Local Area Network (VLAN) 406, subnet 408, router 410, switch 412, software products 416, load balancer 418, and data container 420.

Customer 402 may be, for example, a client or an administrator who uses a data processing system, such as data processing system 300 in FIG. 3. Server 404 may be implemented as a data processing system, such as data processing system 200 in FIG. 2. Server 404 may also be implemented as an application server, which hosts Web services, or other types of servers. Router 410 and switch 412 facilitate communications between different devices. VLAN 406 is a network of computers that behave as if they are connected to the same wire even though they may actually be physically located on different segments of a local area network. Subnet 408 is a portion of a network, which may be a physically independent network segment and shares a network address with other portions of the network.

Software products 416 are applications that may be deployed to a client or a server. Load balancer 418 spreads traffic among multiple systems such that no single system is overwhelmed. Load balancer 418 is normally implemented as software running on a data processing system. Data container 420 may be a database, such as DB2 Universal Database, a product available from International Business Machines Corporation.

Data center 400, as depicted in FIG. 4, is presented for purposes of illustrating the present invention. Other resources, such as, for example, cluster of servers and switch port, also may be included in data center 400. The mechanism of the present invention manages presentation of resource information, including, but not limited to statuses, allocations, assignments, load, inventories of customer 402, server 404, Virtual Local Area Network (VLAN) 406, subnet 408, router 410, switch 412, software products 416, load balancer 418, and data container 420.

Embodiments of the present invention provide a method, an apparatus, and computer instructions for presenting data center information in virtual reality using leading edge rendering engines. The processes of the embodiments of the present invention may be performed by a processing unit comprising one or more processors, such as processor 302 in FIG. 3, using computer implemented instructions, which may be located in a memory such as, for example, main memory 304, memory 324, or in one or more peripheral devices 326 and 330.

In an illustrative embodiment, the present invention leverages existing leading edge rendering engines that support three-dimensional virtual reality representation. An example of leading edge rendering engines includes a virtual reality engine provided by ID software, Inc. With the capabilities of leading edge rendering engines, maps representing data center geography, statuses of data center devices may all be represented in a three-dimensional space.

In an embodiment of the present invention, administrators may navigate and manage data center operations as if the administrators are physically present. Also, devices that are physically remote maybe joined locally in the virtual space to save time in moving between data center installations. Thus, an administrator of the data center may join as players in the virtual space and interact with data center devices regardless of their physical locations.

In addition to maps and device statuses, common functionalities of devices provided by different vendors may be abstracted to a control button in the virtual space. In this way, administrators may easily configure the devices. For example, a create VLAN function may be represented by a control button in the virtual space. If an administrator wants to connect all servers together in a VLAN, the administrator may simply push the control button. This saves significant configuration effort currently spent to configure each server.

In an illustrative embodiment, all servers that support application X may be placed in the same room, while all servers that support application Y may be placed in another room. In this way, maintenance operations may be performed to all servers in the same room at the same time. For example, all servers supporting application X may be turned off, or patches may be applied at the same time. Alternatively, operational status of all servers may be placed in one room, while patch status of these servers may be placed in another room.

Moreover, servers that are free in the free pool room may be assigned to a room for a specific application. In this case, an administrator may physically pick up a server in virtual reality from a stack of servers in a free pool room that contains unassigned servers. The administrator may then carry the server to an application room. By placing the server in the application room, correct operations are requested via the data center management system to remove the server from the free pool, configure it for use in the application, and add it to the cluster.

Alternatively, an application room may include three racks of servers with each rack representing an application tier. The server that was taken from the free pool room may be placed in the appropriate rack to join the cluster of any of the three application tiers. In yet another illustrative embodiment, patches may be applied to servers in a room by spraying them across banks of servers in the room or poured into the room full of servers.

In one example implementation, the mechanism of the present invention may detect that the administrator assigns all servers in a room from VLAN 7 to VLAN 8 using any one of the methods described above. In turn, the mechanism of the present invention sends a message to the existing data center management system that manages those servers, routers, or switches. The data center management system then interacts with the devices that are currently managing the VLANs, and assigns the servers to VLAN 8. The data center management system is a provisioning system that provisions and deprovisions resources.

In an illustrative embodiment, the provisioning system may be modified to include processes of the present invention. For example, the provisioning system may be modified to accept commands from a virtual reality rendering engine. These commands are translated from navigations and movements of data center objects in the virtual space made by the operators. The provisioning system then makes changes to the actual data center devices based on interpretations of the navigations and movements by performing data center operations.

In one scenario, consider a two tier managed application, such as a Web application that consists of servers and network devices. The servers used by the application can be assigned to a free pool, a web server tier, or the Web application tier. Rendered in the virtual space, a room can be dedicated to this type of application, with three racks of servers, one for each of the possible tier assignments. The room is then added to a virtual map, accessible to the operators who are acting as player characters, and moving between rooms.

When an operator enters this application room, the virtual reality rendering engine queries the provisioning system for a list of servers in the Web tier, application tier, and the free pool. The virtual reality rendering engine then represents each server as a non-player character (NPC) or an interactive object (IO), using the appropriate visual representation, and places the servers in the appropriate racks within the room. The virtual reality rendering engine may also register an interest in these servers, and instruct the provisioning system to deliver notifications of any server status or state changes.

In an illustrative embodiment, communication between the provisioning system and the virtual reality rendering engine may be facilitated using any number of mechanisms. One mechanism is by using Simple Object Access Protocol (SOAP) to access Web Services. Queries to the provisioning system from the rendering engine may be made using the Web Services Resource Framework (WSRF). Notifications from the provisioning system to the rendering engine may be provided using Web Services Notification (WS-Notification). The provisioning system may expose Web services to receive instructions from the rendering engine to make changes to the data center. A shared credential system may also allow the rendering engine to request changes from the provisioning system using the identity of the player or operator.

Continuing with the scenario above, if a failure occurs in one of the servers in the Web tier, the provisioning system may send a notification of the state change to the rendering engine. The rendering engine then identifies the affected server by consulting a lookup table, which maps the server identity to the NPC or IO. In the virtual space, an administrator may see a red warning light on a virtual console displayed as a map on a room wall in the main hall. Traveling virtually to the indicated room, the administrator may notice a red, flashing light above the door. Upon entering the room, the administrator may notice that the affected server is glowing red, or a light is flashing on its virtual console.

At this time, the administrator may navigate to the server in its rack, using the movement or action controls for the rendering engine client (typically a computer mouse), and press the button on that server to request a reboot. The rendering engine then translates the action into Web service calls to the provisioning system, again by using a lookup table to determine the correct action and the appropriate server. The provisioning system then reports the state back to the rendering engine, which may indicate that the reboot operation is in progress by showing the server status as yellow.

However, if the reboot operation fails, the administrator needs to remove the failing server from the Web tier, and replace it with one from the free pool. The administrator would, in the virtual space, pick up the bad server, and place it into a trash bin. The rendering engine then recognizes this action as putting the server into a maintenance mode, and makes the appropriate calls to the provisioning system.

Next, the administrator may pick up a server off of the free pool rack. The rendering engine would instruct the provisioning system to remove that server from the free pool. If the free pool is shared, other operators in other application rooms may also see that the server is removed from the free pool, which causes the server to disappear from the view of other operators.

Finally, the administrator would place the free server into the application Web tier, and the rendering engine would instruct the provisioning system to add the new server to the Web tier. The provisioning system would respond by installing, configuring, and starting the appropriate software. Then, the provisioning system updates any network and load balancer routing information. These actions are reported back to the rendering engine as state changes, visually represented to the administrator. Finally, with all servers and the application room showing a green status, the administrator may return to the main hall.

Turning now to FIG. 5, a diagram illustrating a known two-dimensional representation of data center information is depicted. As shown in FIG. 5, in existing data center management systems, a two dimensional representation, such as 2-D representation 500, is presented to administrators.

In this example, 2-D representation 500 illustrates two VLANS, VLAN 1 502 and VLAN 2 509. VLAN 1 502 includes three assigned servers: SVR 1 504, SVR 2 506, and SVR 3 508. Similarly, VLAN 2 509 includes three assigned servers: SVR 4 510, SVR 5 512, and SVR 6 514. Administrators may find out about statuses, assignments, and inventories of VLANs or servers by selecting the individual VLAN or server.

For example, an administrator may select SVR 1 504 from VLAN 1 502 and data center information of SVL 1 504 is presented in 2-D representation 500 accordingly. In this example, data center information of SVR 1 504 includes a patch status of active 516, an assignment to VLAN 1 518 and an assignment to application X 520.

While 2-D representation 500 presents data center information of SVR 1 504 in a navigable way, it is often difficult for administrators to interact with the individual VLAN or server to change the assignments or inventories. The administrator has to manually add SVR 1 504 to VLAN 2 509 and reconfigure SVR 1 504 based on its current data center information, which is cumbersome and time-consuming. Therefore, a more interactive solution is desired.

Figure 6:
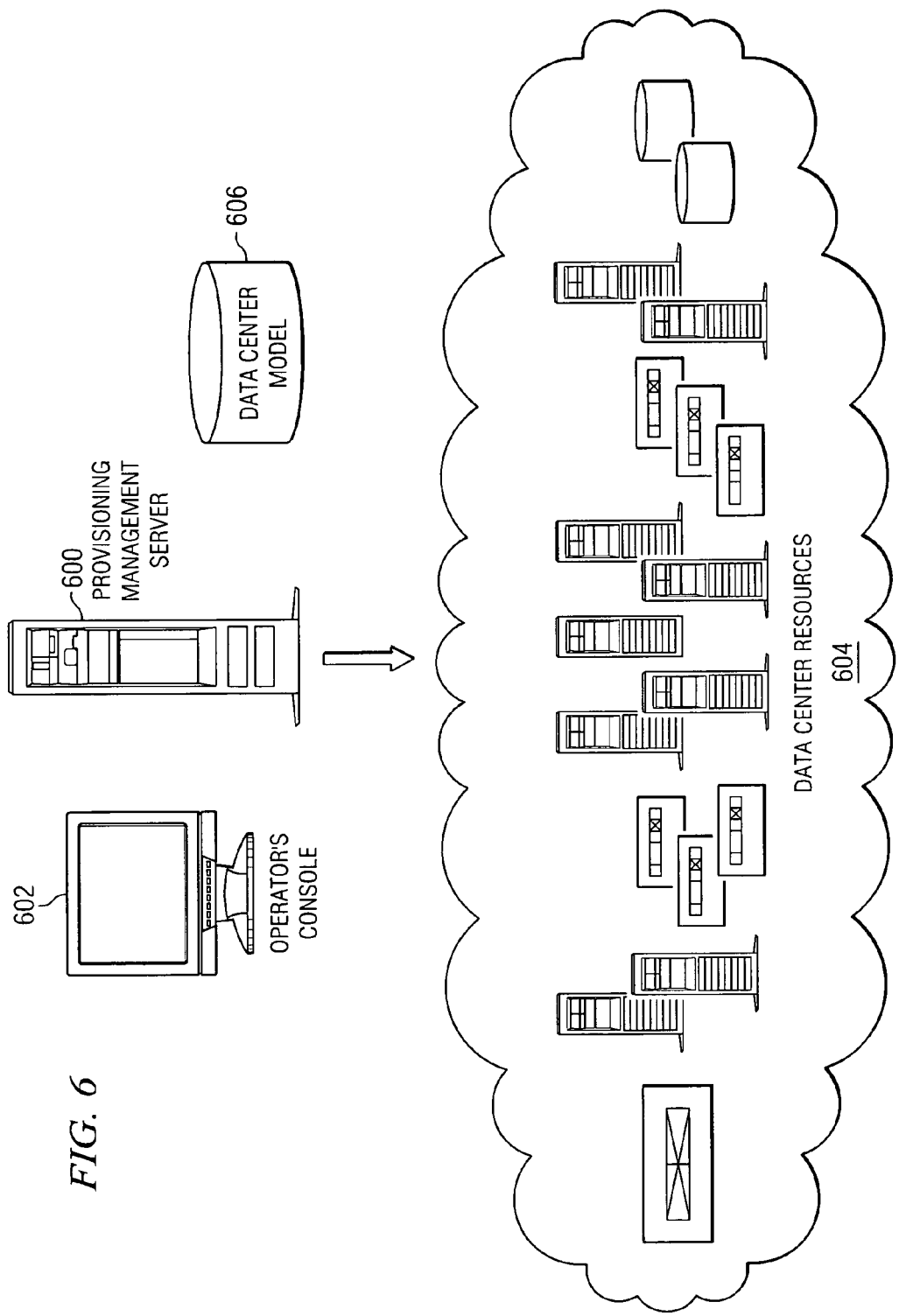
FIG. 6 is a diagram illustrating a known data center management system.

Turning now to FIG. 6, a diagram illustrating a known data center management system is depicted. As shown in FIG. 6, data center management system is a server known as provisioning management server 600. One example of a provisioning management server may be Tivoli Intelligent ThinkDynamics Orchestrator (TITO), a product available from International Business Machines Corporation. An operator may interact with provisioning management server 600 via a 2-D operator's console 602 to configure, manage, and operate data center resources 604. Data center resources 604, as described in FIG. 4, may include a variety of devices, including servers, routers, switches, clusters, VLANs, and storage devices, etc. When the operator changes configuration of a data center device, data center model 606 is updated by provisioning management server 600 to synchronize between physical model and logical model of the data center.

Figure 7:
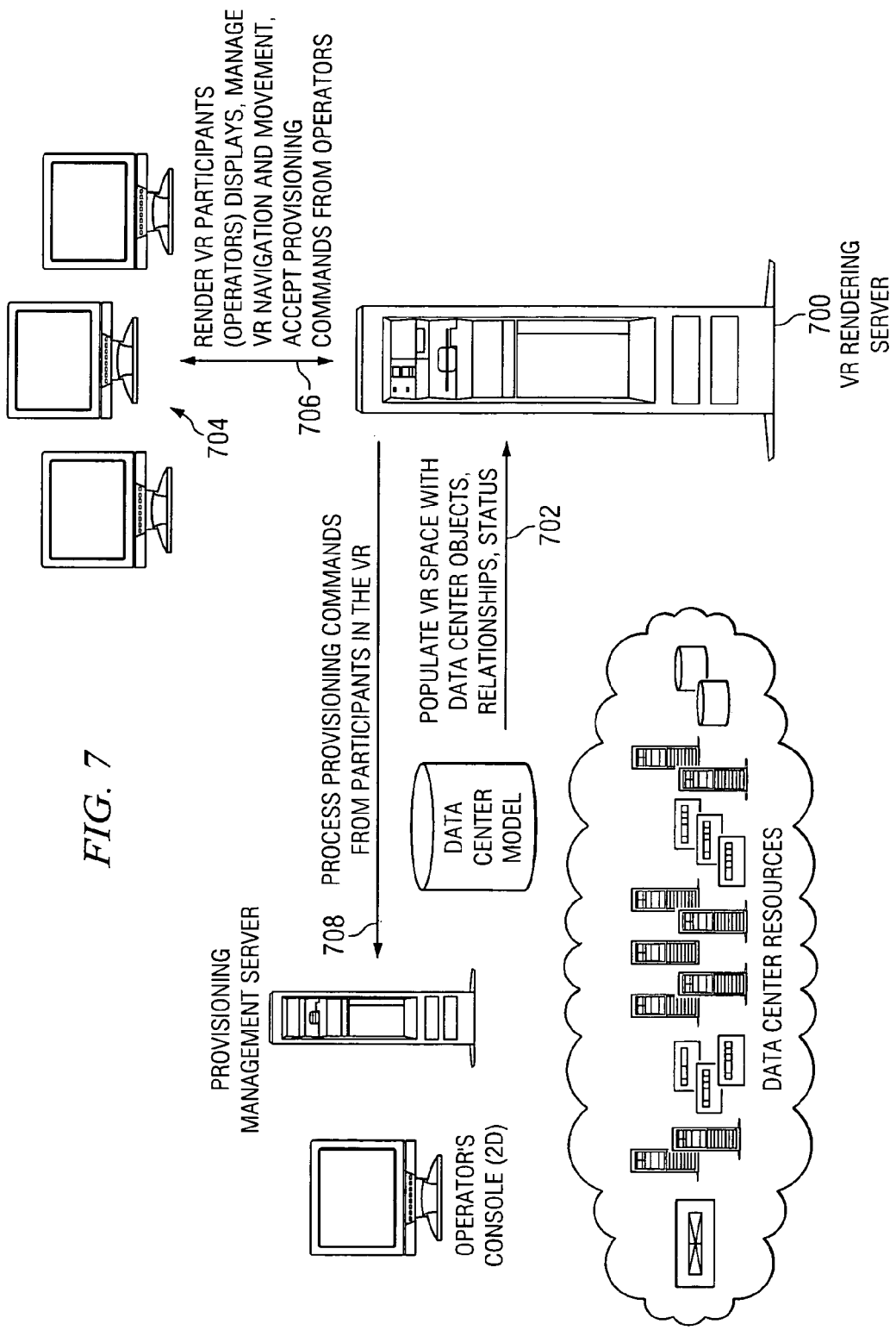
FIG. 7 is a diagram illustrating component interactions when navigable data center information is presented using leading edge 3-D rendering engines in accordance with an illustrative embodiment of the present invention.

Turning now to FIG. 7, a diagram illustrating component interactions when navigable data center information is presented using leading edge 3-D rendering engines is depicted in accordance with an illustrative embodiment of the present invention. As shown in FIG. 7, virtual reality (VR) rendering engine 700 populates the virtual reality space with data center objects representing data center resources, their relationships and statuses 702.

VR rendering engine 700 may send data center information to a plurality of client data processing systems 704 and render the information on the displays as 3-D images from the perspective of the operator's location. These 3-D images represent data center devices, such as servers, disks, or network devices.

Instead of using 2-D operator's console of client data processing systems 704, operators may use a virtual reality helmet, gloves, or eyewear, to navigate and move data center objects just like players of a 3-D game. For example, virtual reality rendering engine provided by ID software, Inc. provides a 3-D view on a 2-D display from the perspective of an operator. This viewpoint is used in a 3-D game, such as games known as first person shooters. Operators may use a keyboard or a mouse to navigate in the 3-D view.

When interacting with data center object, actions that the operators initiated or performed represent data device operations. For example, by pushing a reboot server button, reboot operations are performed on the selected server. In addition to sending data center information, VR rendering engine 700 also manages navigation and movement of the data center objects by the operators and accepts provisioning commands from the operators 706 based on their movement. The commands are translated by a provisioning system from navigation and movements of the data center objects made by operators 708. In turn, the provisioning system makes changes to the actual data center devices based on interpretations of the navigations and movements.

When VR rendering engine 700 renders the 3-D images, the 3-D images may be represented as rooms, and other locations on a map. The rooms and locations represent different aspects of a data center, for example, a room for a multi-tiered application, or all servers that belong to a given VLAN. Furthermore, the 3-D images also include objects or actions in the virtual space that can be manipulated or modified by the operators, for example, network connections between servers.

Since VR rendering engine 700 may represent data center resources in 3-D, the environment in which the data center resources reside may be branded for a particular organization. For example, a room or a wall may be branded with the enterprise corporate colors and logos. In addition, colors and signage may be used to enhance the navigation environment, for example, different colors or logos may be used to assist the operator to find resources that are specific to a division.

Figure 8:
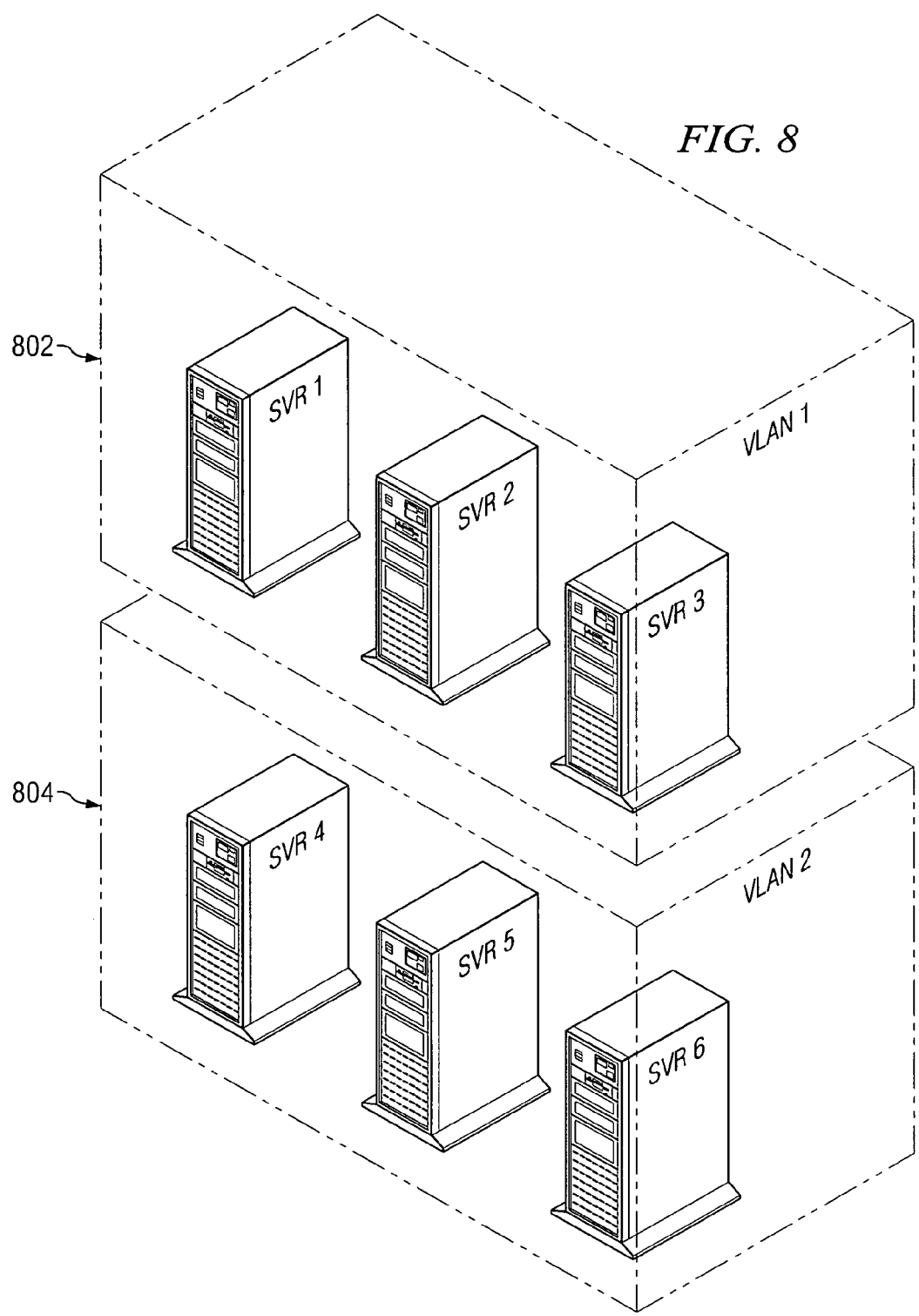
FIG. 8 is a diagram illustrating an exemplary implementation of presenting navigable data center information for VLAN assignments in virtual reality using leading edge rendering engines in accordance with an illustrative embodiment of the present invention.

Turning now to FIG. 8, a diagram illustrating an exemplary implementation of presenting navigable data center information for VLAN assignments in virtual reality using leading edge rendering engines is depicted in accordance with an illustrative embodiment of the present invention.

As shown in FIG. 8, VLAN 1 802 is a room represented in three dimensions using leading edge rendering engines. Similar to VLAN 1 502 in FIG. 5, VLAN 1 802 also includes SVR 1, SVR 2 and SVR 3. Similar to VLAN 2 509 in FIG. 5, VLAN 2 804 includes SVR 4, SVR 5, and SVR 6. Administrators may enter VLAN 1 802 room and interact with SVR 1 directly. In addition, administrators may add SVR 1 to VLAN 2 804 by directly using virtual cables to connect SVR 1. Alternatively, administrators may physically pick up SVR1 and move SVR1 from VLAN 1 802 to VLAN 2 804. Thus, SVR 1 may be added virtually and reconfiguration is performed automatically by a provisioning system responsive to the change.

In addition to VLAN assignments, rooms may be set up to include servers for a specific application or specific status. Furthermore, statuses of devices may be shown virtually on the rendered objects in the room, such that administrators may visually distinguish the devices and the type of device. Statuses of devices may be updated dynamically in the room by changes made by the administrators physically, virtually, or as a result of actual occurrences. For example, status of a server may be updated from idle to busy, or from up to down.

Figure 9:
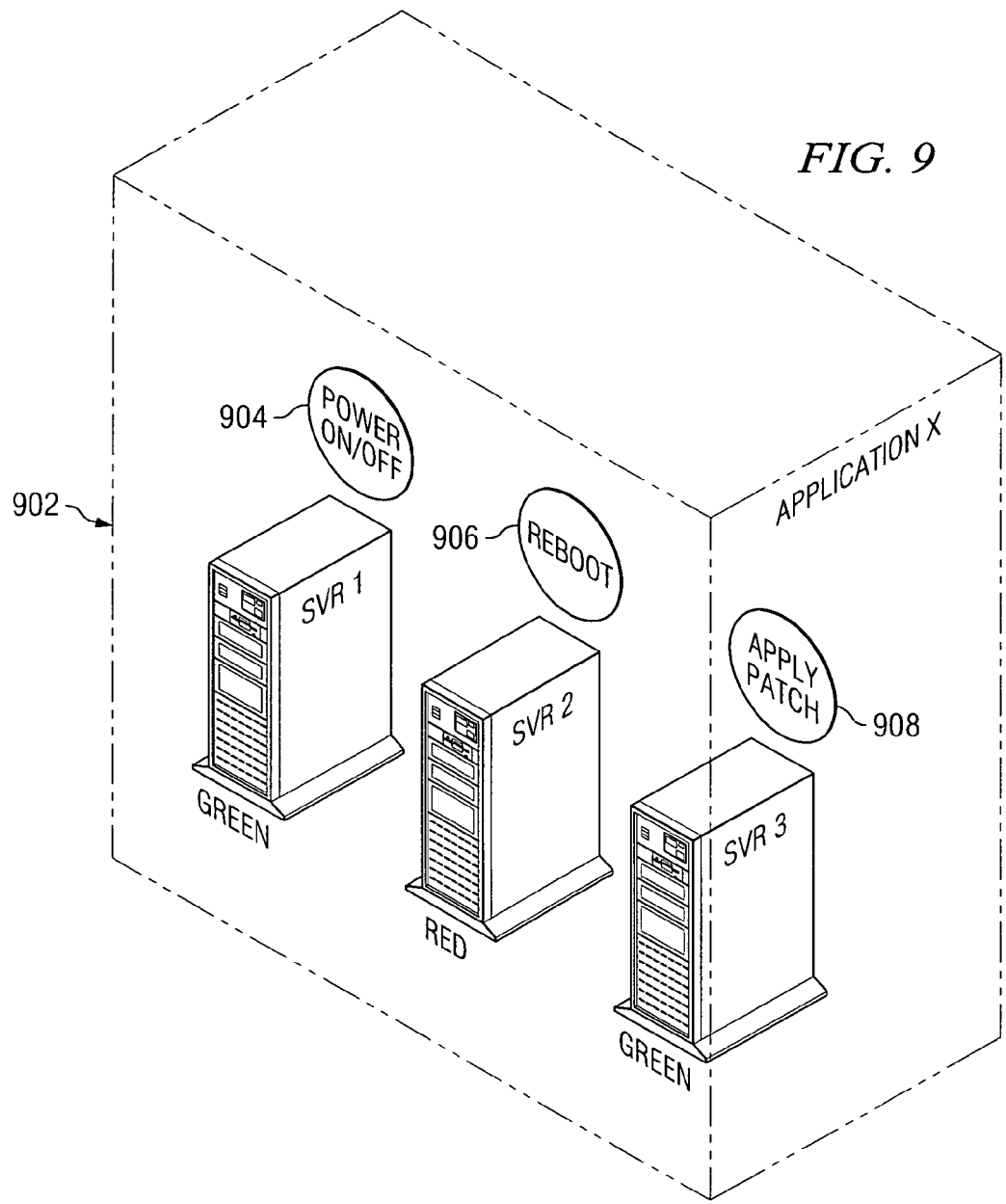
FIG. 9 is a diagram illustrating an exemplary implementation of presenting navigable data center information to illustrate statuses in virtual reality using leading edge rendering engines in accordance with an illustrative embodiment of the present invention.

Turning now to FIG. 9, a diagram illustrating an exemplary implementation of presenting navigable data center information to illustrate statuses in virtual reality using leading edge rendering engines is depicted in accordance with an illustrative embodiment of the present invention.

As shown in FIG. 9, room 902 contains all servers that are assigned to application X. With the mechanism of the present invention, statuses of the servers may be represented by color. For example, SVR 1 and SVR 3 may be shown as green. This means that SVR 1 and SV3 are operating properly.

However, SVR 2 may be shown in red to illustrate that the server needs attention. When SVR 2 is shown as red, administrators may use virtual buttons in room 902 to repair the problem. For example, the administrator may use power on/off button 904 to power on or off SVR 2, use reboot button 906 to reboot SVR 2, or use apply patch button 908 to apply a security patch to SVR 2. Alternatively, the operator may apply a patch by selecting one from a shelf and physically taking the patch off the shelf. The operator may then apply the patch to a target server by directly inserting or attaching it to the target server. In addition to power on/off, reboot server, and apply patches operations, other operations may be represented in the virtual space. For example, moving or assigning resources to distributed applications and application clusters, reconfiguring and assigning devices to load balancers, reconfiguring network connections and routing, creating or changing Virtual Private Networks and VLANs. Thus, with the capabilities of presenting data center devices in three dimensions, administrators may manage and report devices in virtual space without the limitations of two-dimensional displays.

Turning now to FIG. 10, a flowchart of an exemplary process for presenting data center information in virtual reality using leading edge rendering engines is depicted in accordance with an illustrative embodiment of the present invention. As shown in FIG. 10, in this example implementation, the process begins when the mechanism of the present invention constructs a room in the virtual space for a specific purpose (step 1002). For example, one or more rooms may be constructed for all servers that support a specific application or all servers that are assigned to the same VLAN. Alternatively, a single server may reside in one or more rooms without the constraints of the physical world.

Next, the mechanism of the present invention adds devices to a room or other appropriate rooms with their data center information (step 1004). Examples of data center information for the devices include statuses, inventories, load and assignments. The mechanism of the present invention presents the virtual room to administrators in the virtual space (step 1005). Later, the mechanism of the present invention detects changes made by the administrators in the virtual space (step 1006) and sends change messages to the existing data center management system (step 1008). The existing data center management system then makes appropriate changes to the devices (step 1010) and the process terminates thereafter.

In summary, embodiments of the present invention provide a way to present data center information in virtual reality, such that administrators may manipulate data center devices and its information more easily. With the mechanism of embodiments of the present invention, device assignments and statuses may be changed without the need for reconfiguration and remote devices may be connected together regardless of their physical locations.

It is important to note that while embodiments of the present invention have been described in the context of a fully functioning data processing system, those of ordinary skill in the art will appreciate that the processes of embodiments of the present invention are capable of being distributed in the form of a computer usable medium of instructions and a variety of forms and that embodiments of the present invention applies equally regardless of the particular type of signal bearing media actually used to carry out the distribution. Examples of computer usable media include recordable-type media such as a floppy disc, a hard disk drive, a RAM, and CD-ROMs and transmission-type media such as digital and analog communications links.

The description of the embodiments of the present invention have been presented for purposes of illustration and description, but is not intended to be exhaustive or limited to embodiments of the invention in the form disclosed. Many modifications and variations will be apparent to those of ordinary skill in the art. The embodiments were chosen and described in order to best explain the principles of the invention, the practical application, and to enable others of ordinary skill in the art to understand embodiments of the invention for various embodiments with various modifications as are suited to the particular use contemplated.

What is claimed is:

1. A method in a data processing system for presenting navigable data center information, the method comprising:
constructing a virtual reality space using a three-dimensional rendering engine;
populating the virtual reality space with data center information specific to a physical data center;
rendering the virtual reality space that is populated with the data center information in a user interface to at least one operator, wherein the virtual reality space that is populated with the data center information and rendered includes data center objects, at least three rooms, and at least one location on a map representing the physical data center, wherein the at least three rooms are (i) a free pool room depicting free servers that are not currently assigned to either one of an application and a network, (ii) an application room depicting all servers assigned to a given application, where other servers that are not assigned to the given application are not depicted in the application room, and (iii) a virtual local area network (VLAN) room depicting all servers belonging to a particular virtual local area network, where other servers not assigned to the particular virtual local area network are not depicted in the VLAN room; and responsive to receiving commands from the at least one operator, performing data center operations on data center devices based on the commands, wherein the data center devices are associated with at least some of the data center objects, wherein the commands are translated by a provisioning system from navigations and movements made by the at least one operator, and wherein the navigations and movements are managed by the three-dimensional rendering engine, and wherein the navigations and movements include: (i) picking up a server from a stack of servers in the free pool room and carrying the server to the application room to facilitate assigning the server to a cluster for the given application, and (ii) picking up another server from the stack of servers in the free pool room and carrying the another server to the virtual local area network room to facilitate assigning the another server to the particular virtual local area network;

wherein the data center information is dynamically updated by a virtual reality rendering engine responsive to a status change, and wherein the status change is triggered by one of a physical change made by the at least one operator, a change in the virtual reality space made by another operator, and actual occurrences of status changes;

and wherein the user interface includes a two-dimensional display of a data processing system, wherein the two-dimensional display displays a view port into a three-dimensional space, and wherein the three-dimensional space further depicts a control button that is operable for configuring at least one of the data center objects.

2. The method of claim 1, wherein the data center information that is populated in the virtual reality space and rendered includes the data center objects, relationships between the data center objects, and statuses of the data center objects.

3. The method of claim 1, wherein the provisioning system makes changes to the data center devices based on interpretations of the navigations and movements made by the at least one operator.

4. The method of claim 2, wherein the data center objects that are rendered include at least one of servers, disks, and network devices, and wherein the at least one operator is a data center administrator, wherein current operational statuses are also shown in the three-dimensional space for at least some of the data center objects that are rendered.

5. The method of claim 1, wherein the data center operations include all of a reboot server operation, power on/off operation, an apply patch operation, a move or assign operation to move or assign resources to distributed applications and application clusters, a reconfigure and assign operation to reconfigure and assign devices to load balancers, a reconfigure operation to reconfigure network connections and routing, and a create or change operation to create or change virtual private networks and virtual local area networks.

6. The method of claim 1, wherein the navigations and movements include joining at least one server to the virtual local area network by using a virtual cable.

7. The method of claim 1, wherein environment of the at least three rooms is enhanced with colors and signage in the virtual reality space.

8. The method of claim 5, wherein the apply patch operation includes picking up a patch off a shelf and attaching the patch to a target server.

* * * * *